(12) United States Patent
Bergeron

(10) Patent No.: US 6,698,771 B1
(45) Date of Patent: Mar. 2, 2004

(54) WHEELED CADDY FOR WASHING A VEHICLE

(76) Inventor: Keith Bergeron, 224 Champion St., Gray, LA (US) 70359

( * ) Notice: Subject to any disclaimer, the term of this patent is extended or adjusted under 35 U.S.C. 154(b) by 18 days.

(21) Appl. No.: 10/076,997

(22) Filed: Feb. 19, 2002

(51) Int. Cl.$^7$ .............................. B62B 11/00; B62B 1/00
(52) U.S. Cl. .................................. 280/47.35; 280/79.5
(58) Field of Search ........................... 280/47.34, 47.35, 280/79.5, 655.1; 206/223, 224, 225, 226, 229, 318, 373; 220/4.26, 23.2, 555; 224/547; 248/222.14; 15/264, 323, 339; 190/18 A

(56) References Cited

U.S. PATENT DOCUMENTS

| | | | | |
|---|---|---|---|---|
| 2,704,673 A | * | 3/1955 | Bower .................... | 280/47.19 |
| 4,222,580 A | * | 9/1980 | Krokonko ................ | 280/47.34 |
| 4,475,660 A | * | 10/1984 | Cain ........................ | 211/113 |
| 4,546,903 A | * | 10/1985 | Burch ...................... | 222/130 |
| 4,861,050 A | * | 8/1989 | Bergeron ................ | 280/47.35 |
| 5,035,321 A | * | 7/1991 | Denton .................... | 206/225 |
| 5,095,579 A | * | 3/1992 | Becker ..................... | 15/339 |
| D326,347 S | * | 5/1992 | Ancona et al. ............ | D34/45 |
| 5,183,280 A | * | 2/1993 | Gresch .................... | 280/79.5 |
| 5,390,944 A | * | 2/1995 | Sherwin .................. | 280/47.35 |
| 5,752,543 A | * | 5/1998 | Groening ................. | 137/312 |
| 5,839,771 A | * | 11/1998 | DeMars .................... | 294/146 |
| 5,860,659 A | * | 1/1999 | Hart ......................... | 280/79.5 |
| 5,909,832 A | * | 6/1999 | French et al. ............ | 224/547 |
| 6,315,310 B1 | * | 11/2001 | Hurt ......................... | 280/79.5 |
| 6,419,246 B1 | * | 7/2002 | Neal ......................... | 280/79.5 |
| 6,488,293 B1 | * | 12/2002 | Mitchell et al. .......... | 280/47.34 |
| 2003/0052465 A1 | * | 3/2003 | Ahmed et al. ............ | 280/79.5 |

* cited by examiner

*Primary Examiner*—Brian L. Johnson
*Assistant Examiner*—G B Klebe

(57) ABSTRACT

A wheeled caddy for washing a vehicle for providing tools and supplies readily reachable for a user to wash one's vehicle. The wheeled caddy for washing a vehicle includes a base assembly including a base member being mounted upon a wheel assembly for movement upon a ground; and also includes a support member being mounted upon the base member and having an open top; and further includes a handle assembly including a handle holder member being securely attached to the support member, and also including a handle member being pivotally attached to the support member; and further includes a bucket being removably supported upon the support member; and also includes cleaning accessory holders being securely attached to the support member for holding items used to wash a vehicle.

3 Claims, 3 Drawing Sheets

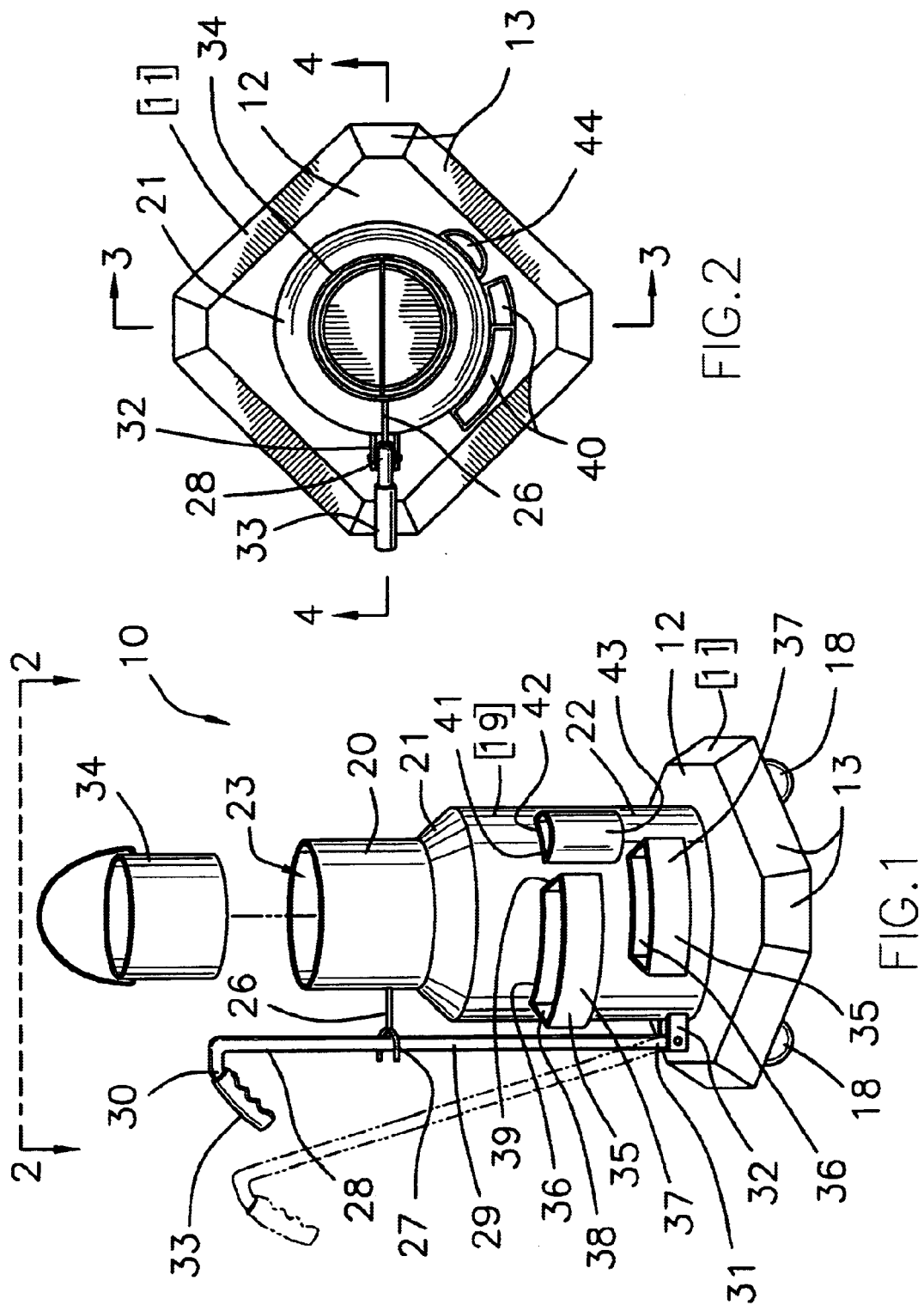

WHEELED CADDY FOR WASHING A VEHICLE

BACKGROUND OF THE INVENTION

1. Field of the Invention

The present invention relates to caddies used for washing vehicles and more particularly pertains to a new wheeled caddy for washing a vehicle for providing tools and supplies readily reachable for a user to wash one's vehicle.

2. Description of the Prior Art

The use of caddies used for washing vehicles is known in the prior art. More specifically, caddies used for washing vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,475,660; U.S. Pat. No. 5,839,771; U.S. Pat. No. 5,909,832; U.S. Pat. No. 5,095,579; U.S. Pat. No. 5,035,321; and U.S. Pat. No. Des. 326,347.

While these devices fulfill their respective, particular objectives and requirements, the aforementioned patents do not disclose a new wheeled caddy for washing a vehicle. The prior art describes inventions having baskets with multiple storage compartments and with carrying handles.

SUMMARY OF THE INVENTION

The general purpose of the present invention, which will be described subsequently in greater detail, is to provide a new wheeled caddy for washing a vehicle which has many of the advantages of the caddies used for washing vehicles mentioned heretofore and many novel features that result in a new wheeled caddy for washing a vehicle which is not anticipated, rendered obvious, suggested, or even implied by any of the prior art, either alone or in any combination thereof. The present invention includes a base assembly including a base member being mounted upon a wheel assembly for movement upon a ground; and also includes a support member being mounted upon the base member and having an open top; and further includes a handle assembly including a handle holder member being securely attached to the support member, and also including a handle member being pivotally attached to the support member; and further includes a bucket being removably supported upon the support member; and also includes cleaning accessory holders being securely attached to the support member for holding items used to wash a vehicle. None of the prior art describes a caddy capable of supporting a bucket filled with water.

There has thus been outlined, rather broadly, the more important features of the wheeled caddy for washing a vehicle in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new wheeled caddy for washing a vehicle which has many of the advantages of the caddies used for washing vehicles mentioned heretofore and many novel features that result in a new wheeled caddy for washing a vehicle which is not anticipated, rendered obvious, suggested, or even implied by any of the prior art, either alone or in any combination thereof.

Still another object of the present invention is to provide a new wheeled caddy for washing a vehicle for providing tools and supplies readily reachable for a user to wash one's vehicle.

Still yet another object of the present invention is to provide a new wheeled caddy for washing a vehicle that is easy and convenient to set up and use.

Even still another object of the present invention is to provide a new wheeled caddy for washing a vehicle that saves the user time and also allows the user to reach the bucket without having to constantly stoop over.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new wheeled caddy for washing a vehicle according to the present invention and shown in use.

FIG. 2 is a top plan view of the present invention.

DESCRIPTION OF THE PREFERRED EMBODIMENT

Figure 3:
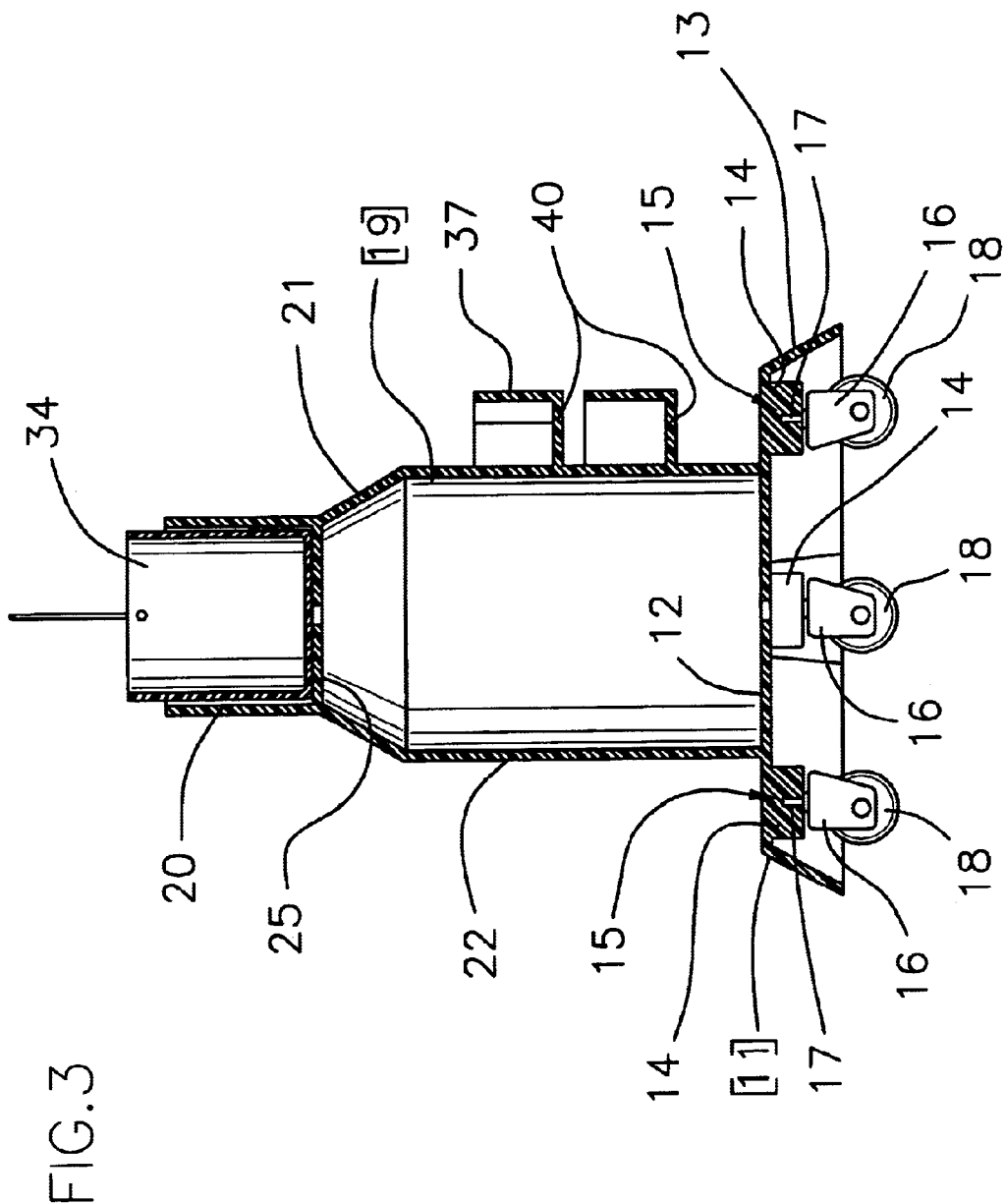
FIG. 3 is a longitudinal cross-sectional view of the present invention.
Figure 4:
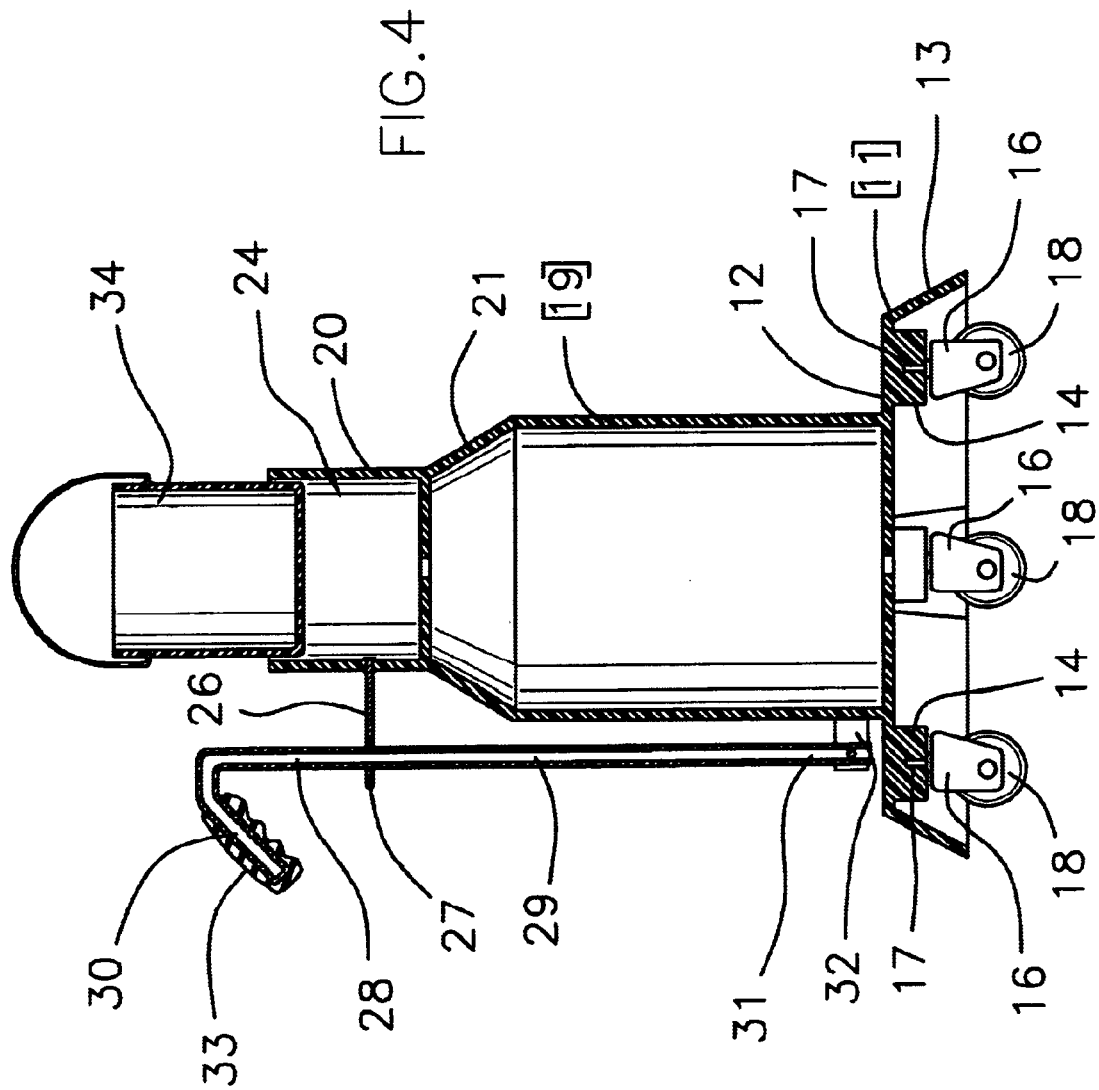
FIG. 4 is another longitudinal cross-sectional view of the present invention

With reference now to the drawings, and in particular to FIGS. 1 through 4 thereof, a new wheeled caddy for washing a vehicle embodying the principles and concepts of the present invention and generally designated by the reference numeral 10 will be described.

As best illustrated in FIGS. 1 through 4, the wheeled caddy for washing a vehicle 10 generally comprises a base assembly including a base member 11 being securely mounted upon a wheel assembly for movement upon a ground. The base member 11 includes a main wall 12 and a perimeter wall assembly 13 conventionally depending downwardly from and along a perimeter of the main wall 12, and also includes block-like wheel support members 14 being securely and conventionally attached and welded to a bottom side of the main wall 12 and each having a bore 15 extending therein through a bottom thereof. The wheel assembly includes bracket members 16, and also includes stub shafts 17 being conventionally attached to and extended from the bracket members 16 and being removably and securely disposed in the bores 15 of the block-like wheel support members 14, and further includes wheels 18 being rotatably and conventionally mounted to the bracket members 16.

A support member is conventionally mounted upon the base member 11 and has an open top 23. The support member includes a barrel-shaped member 19 being securely and conventionally mounted upon the main wall 12 of the base member 11, and also includes a shelf member 25 being securely and conventionally disposed in the barrel-shaped member 19. The barrel-shaped member 19 has an upper portion 20, an intermediate portion 21 and a lower portion 22. The lower portion 22 has a greater circumference than the upper portion 20 with the intermediate portion 21 being tapered from the lower portion 22 to the upper portion 20. The upper portion 20 has a storage compartment 24 therein which is accessible through the open top 23. The shelf member 25 is securely and conventionally attached and welded at a junction of the upper and intermediate portions 20, 21.

A handle assembly includes a handle holder member 26, 27 being securely and conventionally attached and welded to the support member, and also includes a handle member 28 being pivotally attached to the support member. The handle holder member 26, 27 is generally a Y-shaped member having a stem portion 26 which is securely and conventionally attached to an exterior of the upper portion 20 of the barrel-shaped member 19, and also having an arcuate portion 27 being integrally attached at an end of the stem portion 26. The handle member 28 is removably rested against the arcuate portion 27. The handle assembly further includes a support bracket 32 being securely and conventionally attached to an exterior of the lower portion 22 of the barrel-shaped member 19. The handle member 28 includes an elongate shaft 29 having a curved first end portion 30 and also having a second end 31 which is hingedly attached to the support bracket 32, and also includes a sleeve-like grip member 33 being conventionally disposed about the first end portion 30 of the handle member 28.

A bucket 34 is removably supported upon the support member. The bucket 34 is removably stored in the upper portion 20 of the barrel-shaped member 19 and is supported upon the shelf member 25. Cleaning accessory holders are securely and conventionally attached to the support member for holding items used to wash a vehicle. The cleaning accessory holders include a plurality of trays 35 being securely and conventionally attached to an exterior of the lower portion 22 of the barrel-shaped member 19, and also includes a brush holder 41 being securely and conventionally attached to the exterior of the lower portion 22 of the barrel-shaped member 19. Each of the tray members 35 includes an arcuate back wall 36 being securely and conventionally attached to the barrel-shaped member 19, and also includes an arcuate front wall 37, and further includes side and bottom walls 38–40 and an open top. The brush holder 41 includes an arcuate back wall 42 being securely and conventionally attached to the barrel-shaped member 19 and also includes an outwardly-bowed front wall 43 and further includes a bottom wall 44 and an open top.

In use, the user places the necessary cleaning items including brushes and chamois and also including cleaning solutions such as polishes in the trays 35 and the brush holder 41, and also fills the bucket 34 with water and soap and places the bucket 34 upon the shelf member 25 in the upper portion 20 of the barrel-shaped member 19. The user can easily move the wheeled caddy 10 to any location by simply grasping the handle member 28 and either pushing or pulling the wheeled caddy 10. The user is able to use whatever one needs from the wheeled caddy 10 to wash and clean one's vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the wheeled caddy for washing a vehicle. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheeled caddy for washing a vehicle comprising:
   a base assembly including a base member being mounted upon a wheel assembly for movement upon a supporting surface, said base member including a main wall and a perimeter wall assembly depending downwardly from and along a perimeter of said main wall, and also including block-like wheel support members being securely attached to a bottom side of said main wall, each of said block-like wheel support members having a bore extending therein through a bottom thereof;
   a support member being mounted upon said base member and having an open top, said support member including a barrel-shaped member being securely mounted upon said main wall of said base member, and also including a shelf member being securely disposed in said barrel-shaped member, said barrel-shaped member having an upper portion, an intermediate portion and a lower portion, said lower portion having a greater circumference than said upper portion, said intermediate portion being tapered from said lower portion to said upper portion, said upper portion having a storage compartment therein which is accessible through said open top;
   a handle assembly including a handle holder member being securely attached to said support member, and also including a handle member being pivotally attached to said support member, said handle holder member being generally a Y-shaped member having a stem portion which is securely attached to an exterior of said upper portion of said barrel-shaped member, and also having an arcuate portion being integrally attached at an end of said stem portion, said handle member being removably rested against said arcuate portion;
   a bucket being removably supported upon said support member; and
   cleaning accessory holders being securely attached to said support member for holding items used to wash a vehicle.

2. A wheeled caddy for washing a vehicle as described in claim 1, wherein said handle assembly further includes a support bracket being securely attached to an exterior of said lower portion of said barrel-shaped member.

3. A wheeled caddy for washing a vehicle as described in claim 2 wherein said handle member includes an elongate shaft having a curved first end portion and also having a second end which is hingedly attached to said support bracket, and also includes a sleeve-like grip member being disposed about said first end portion of said handle member.

* * * * *